United States Patent
Zhang et al.

(10) Patent No.: US 6,628,858 B2
(45) Date of Patent: Sep. 30, 2003

(54) WAVEGUIDE BRAGG-GRATING BASED ALL-OPTICAL WAVELENGTH-ROUTING SWITCH WITH WAVELENGTH CONVERSION

(75) Inventors: Jianjun Zhang, Cupertino, CA (US); Peiching Ling, San Jose, CA (US); Jinliang Chen, Saratoga, CA (US); Ming Xu, San Jose, CA (US)

(73) Assignee: Integrated Optics Communications Corporation, Sunnyvale, CA (US)

( * ) Notice: Subject to any disclaimer, the term of this patent is extended or adjusted under 35 U.S.C. 154(b) by 0 days.

(21) Appl. No.: 10/326,132

(22) Filed: Dec. 19, 2002

(65) Prior Publication Data

US 2003/0128918 A1 Jul. 10, 2003

Related U.S. Application Data

(60) Provisional application No. 60/348,927, filed on Oct. 22, 2001, provisional application No. 60/346,567, filed on Jan. 8, 2002, and provisional application No. 60/373,803, filed on Apr. 19, 2002.

(51) Int. Cl.[7] .................................................. G02B 6/28

(52) U.S. Cl. ................ 385/24; 385/16; 389/45
(58) Field of Search ................ 385/16, 20–24, 385/147, 42, 43, 44, 45

(56) References Cited

U.S. PATENT DOCUMENTS 5,422,611 A * 6/1995 Kashima et al. ............ 333/137
5,802,222 A * 9/1998 Rasch et al. .................... 385/1

* cited by examiner

*Primary Examiner*—Akm Enayet Ullah
(74) *Attorney, Agent, or Firm*—Perkins Coie LLP

(57) ABSTRACT

An all-optical switch with wavelength conversion is disclosed. The optical switch comprises an input waveguide for carrying a multiplexed optical signal comprised of a plurality of wavelength channels. Further included is a demultiplexer for separating the multiplexed optical signal into the plurality of wavelength channels. The wavelength channels are then provided to a wavelength converter operative to convert the wavelength channels into a converted wavelength channel. The converted wavelength channels are input to a switch operative to switch the converted wavelength channels onto output waveguides.

20 Claims, 18 Drawing Sheets

"ON"

"OFF"

WAVEGUIDE BRAGG-GRATING BASED ALL-OPTICAL WAVELENGTH-ROUTING SWITCH WITH WAVELENGTH CONVERSION

RELATED APPLICATIONS

"Priority is hereby claimed under 35 U.S. C. §120 to U.S. Provisinal Patent Application Ser. No. 60/348,927 filed Oct. 22. 2001, U.S. Provisonal Patent Application Ser. No. 60/346,567 filed Jan. 8, 2002, U.S. Provisional Patent Application No. 60/373,803 filed Apr. 19, 2002, and U.S. Patent Application Ser. No. 10/104,273 filed Mar. 22, 2002, each of which is incorporated by reference."

BACKGROUND OF THE INVENTION

1. Technical Field of the Invention

This invention relates to an optical switch, and more particularly, an optical switch using integrated Bragg grating technology and that is able to provide full wavelength conversion.

2. Description of the Prior Art

Current optical switching systems usually are for optical signals covering a range of spectrum without wavelength differentiation or selection. Historically, in the wavelength division multiplex (WDM) networks of the past, adding, dropping, cross connecting, or wavelength conversion of individual wavelengths has involved conversion of the signal back to the electrical domain. More recent development of the optical switches now provide an advantage that the optical signals are switched entirely in the optical domain without converting these signals into electrical signals. However, due to the multiplexing and de-multiplexing requirements by discrete components, the cost and size of these switches is high. It is desirable to have wavelength selective switching and routing capability, in addition to optical wavelength conversion.

BRIEF DESCRIPTION OF THE DRAWINGS

The nature, advantages and various additional features of the invention will appear more fully upon consideration of the illustrative embodiments now to be described in connection with the accompanying drawings, wherein.

It is to be understood that these drawings are for purposes of illustrating the concepts of the invention and are not to scale.

DETAILED DESCRIPTION

The present invention discloses an optical switch with wavelength conversion using integrated Bragg-grating technology. The optical switch can be manufactured using semiconductor fabrication, planar-lightwave-circuit (PLC), and micro-electromechanical system (MEMS) technology.

In the following description, numerous specific details are provided to provide a thorough understanding of the embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout the specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout the specification are not necessarily all referring to the same embodiment. Furthermore, the particular features, structures, or characteristics may be combined in any suitable manner in one or more embodiments.

Further, although the present invention is described in terms of a WDM system, the apparatus and method of the present invention can equally be applicable to any optical system that utilizes multiple frequencies. Thus, the description below is but one embodiment of the present invention.

Figure 1:
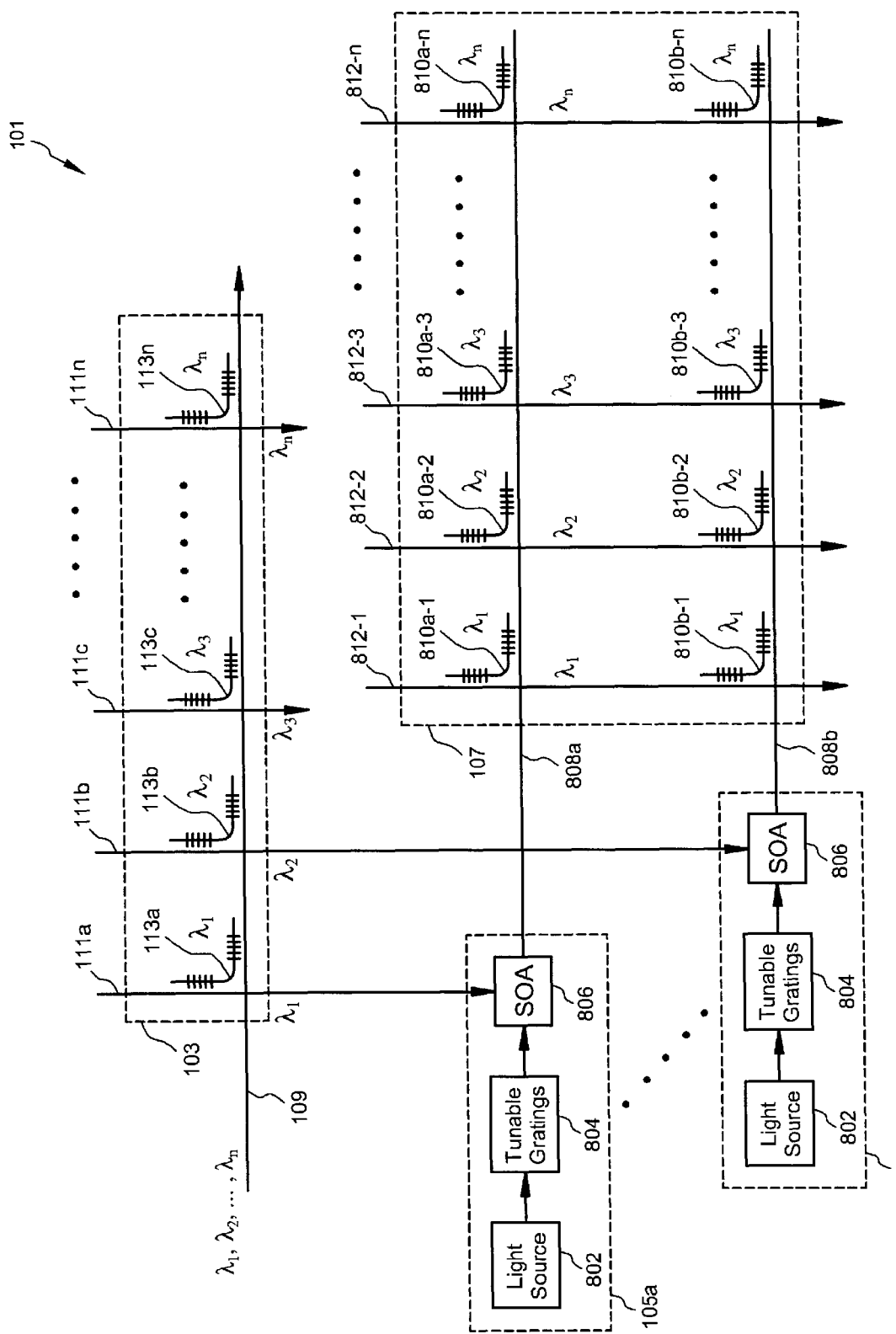
FIG. 1 is a schematic diagram of an optical switch formed according to one embodiment of the present invention.

FIG. 1 illustrates an optical switch 101 formed in accordance with one embodiment of the present invention. The optical switch includes a demultiplexer 103, a plurality of wavelength converters 105a–b, and output switch 107. Each of these components will be described in detail below.

Figure 3A:
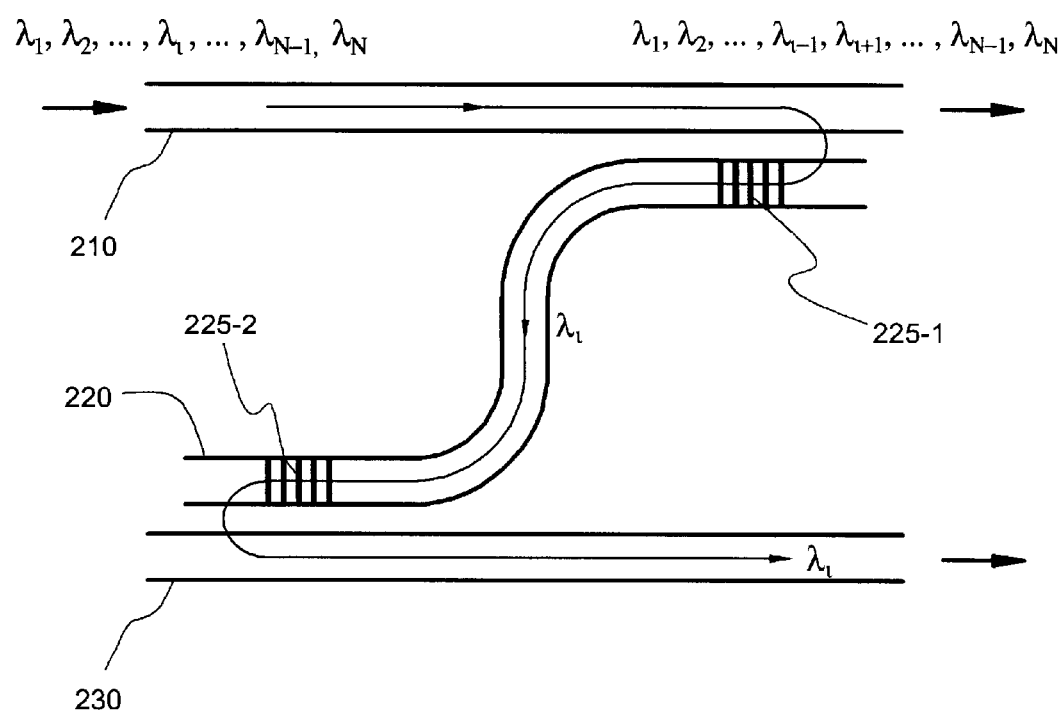
FIGS. 3A to 3B are cross sectional views for showing coupling configurations of a wavelength-selective bridge waveguide coupled between a waveguide and an outbound waveguide.

The demultiplexer 103 includes an input waveguide 109, a plurality of intersecting waveguides 111a–111n, and a plurality of demultiplexer switches 113a–113n. The intersecting waveguides 111a–n intersect with the input waveguide 109 at intersections. Disposed at the intersections of the intersecting waveguides 111a14 111n and the input waveguide 109 are demultiplexer switches 113a–n. As seen in further detail below, the switches 113a–n are selectively capable (when activated) of redirecting light of a specific wavelength into the associated intersecting waveguide 111a–n. The demultiplexer switches 113a–n are Bragg-grating based switches and are of the type disclosed in our co-pending applications noted above and which are herein incorporated by reference in their entirety. However, a description is provided herein for completeness. Note further that the below description shows many types of switches including switches that do not require "intersection" between the intersecting waveguides 111 and the input waveguide 109. The terms intersecting or intersecting waveguide as used herein are not be limited to a physical intersection. Rather any proximal relationship between the "intersecting waveguide" and an input waveguide such that coupling of a desired wavelength channel is accomplished between the input waveguide and "intersecting waveguide", such as (merely one example) the parallel orientation as shown in FIG. 3A, satisfies the terms intersecting, intersection, or intersecting waveguide.

Figure 2A:
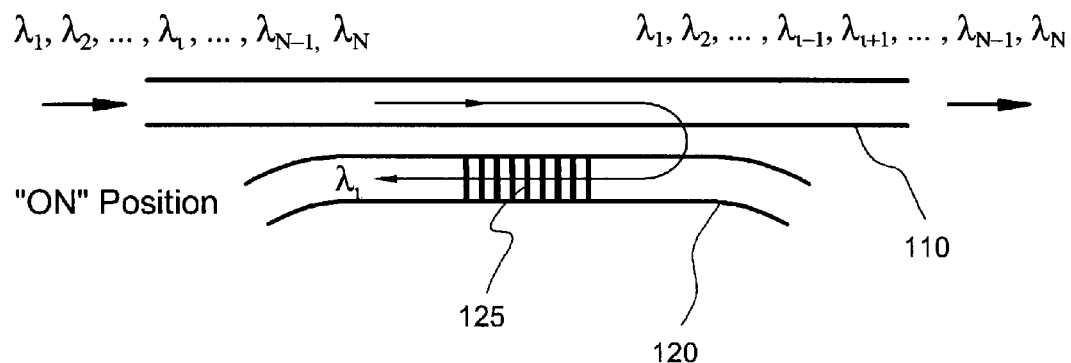
FIGS. 2A to 2F are schematic diagrams showing the on/off switching functions of a wavelength selective bridge waveguide of this invention.
Figure 2B:
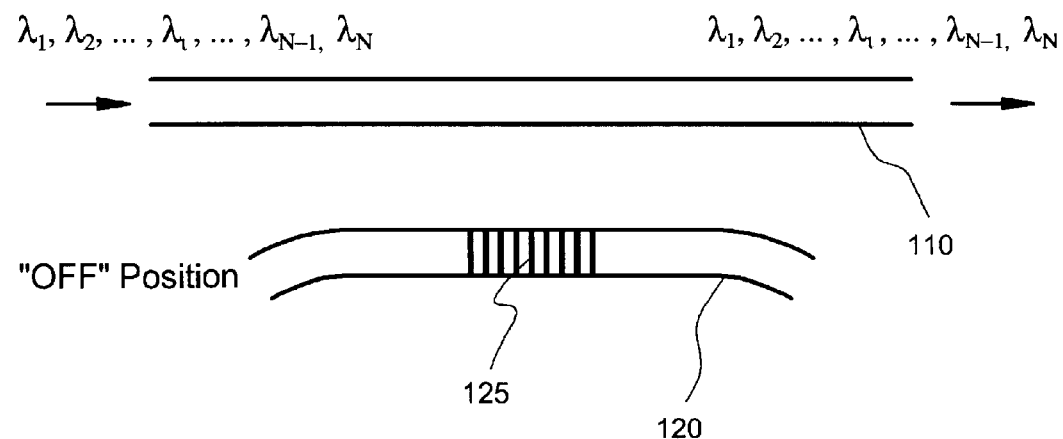

FIGS. 2A and 2B are schematic diagrams for showing the principles of operation of the switches 113a–n. A multiplexed optical signal is transmitted in an optical waveguide 110 over N multiplexed wavelengths $\lambda_1, \lambda_2, \lambda_3, \ldots, \lambda_N$ where N is a positive integer. This is a general characterization of a plurality of wavelengths carried by the waveguide 110. In the embodiment of FIG. 1, the waveguide 110 is equivalent to the input waveguide 109.

In FIG. 2A, a wavelength selective bridge waveguide 120 is moved to an on-position and coupled to the waveguide 110. An optical signal with a central wavelength λi particular to the Bragg gratings 125 disposed on the bridge waveguide 120 is guided into the wavelength selective bridge waveguide 120. The remaining wavelengths $\lambda_1, \lambda_2, \ldots, \lambda_{i-1}, \ldots, \lambda_{i+1}, \ldots, \lambda_N$ are not affected and continues to propagate over the waveguide 110. The Bragg gratings 125 have a specific pitch for reflecting the optical signal of the selected wavelength λi onto the wavelength selective bridge waveguide 120.

In FIG. 2B, the wavelength selective bridge waveguide 120 is moved away from the waveguide 110 to a "bridge-off" position. There is no coupling between to the waveguide 110 and therefore no "detoured signal" entering into the bridge waveguide 120. The entire multiplexed signal over wavelengths $\lambda_1, \lambda_2, \lambda_3, \ldots, \lambda_N$ continue to propagate on the waveguide 110.

Figure 2C:
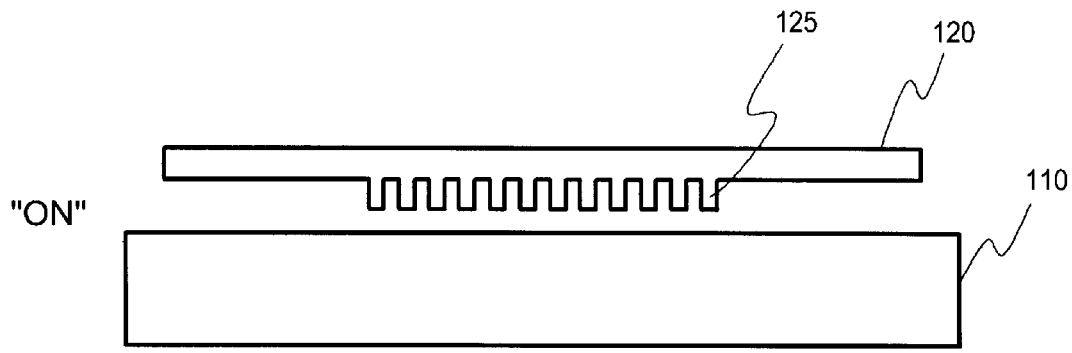
Figure 2D:
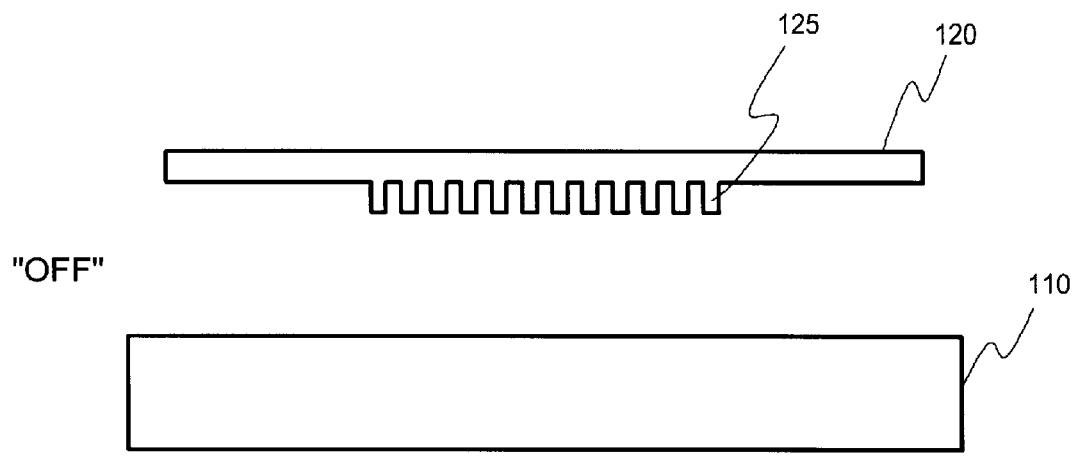
Figure 2E:
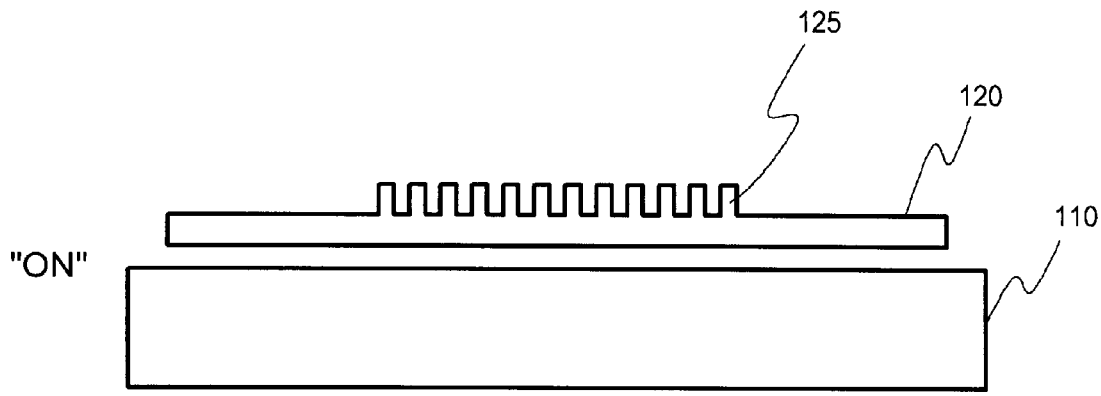
Figure 2F:
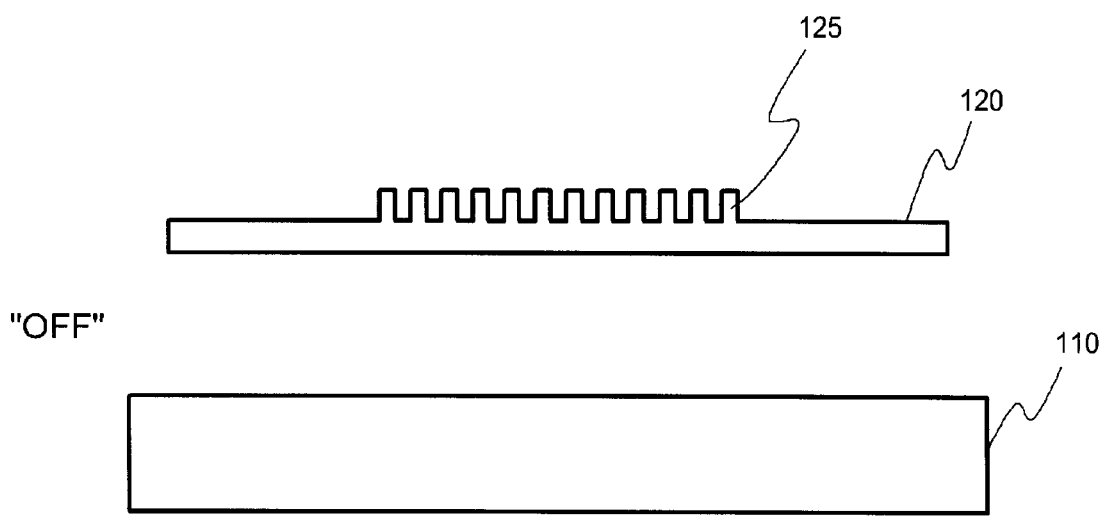

FIGS. 2C and 2D illustrate a detailed configuration of the Bragg-gratings formed on the wavelength selective bridge waveguide 120. The pitch between the gratings 125 defines a selected wavelength that will be reflected onto the bridge waveguide 120 when the wavelength selective bridge waveguide is at an on-position coupled to the waveguide 110 as that shown in FIG. 2A. Furthermore, as shown in FIGS. 2E and .2F, the Bragg-gratings 125 may be formed on a surface of the bridge waveguide 120 opposite the waveguide 110. Again, as the bridge waveguide 120 is moved to an "on" position coupled to the waveguide 110 in FIGS. 2C and 2E, an optical signal of a selected wavelength defined by the pitch between the Bragg gratings is coupled into the bridge waveguide 120. When the bridge waveguide 120 is moved to an "off" position in FIGS. 2D and 2F, the bridge waveguide 120 is completely decoupled and there is no "detoured signal" into the bridge waveguide 120.

FIG. 3A shows a wavelength selective bridge waveguide 220 coupled between a bus waveguide 210 and a second waveguide 230. A multiplexed optical signal is transmitted in a bus waveguide 210 over N multiplexed wavelengths $\lambda_1, \lambda_2, \lambda_3, \ldots, \lambda_N$ where N is a positive integer. The wavelength selective bridge waveguide 220 has a first set of Bragg gratings disposed on a first "bridge on-ramp segment" 225-1 for coupling to the bus waveguide 210. An optical signal with a central wavelength A particular to the Bragg gratings 225 disposed on the bridge waveguide 220 is guided through the first bridge ramp segment 225-1 to be reflected into the wavelength selective bridge waveguide 220.

The remainder optical signals of the wavelengths $\lambda_1, \lambda_2, \lambda_3, \lambda_{i-1}, \ldots, \lambda_{i+1}, \ldots, \lambda_N$ are not affected and continues to transmit over the waveguide 210. The Bragg grating 225 has a specific pitch for reflecting the optical signal of the selected wavelength A onto the wavelength selective bridge waveguide 220. The wavelength selective bridge waveguide 220 further has a second set of Bragg gratings as a bridge off-ramp segment 225-2 coupled to an outbound waveguide 230. The second set of Bragg gratings has a same pitch as the first set of Bragg gratings. The selected wavelength $\lambda_i$ is guided through the bridge off-ramp segment 225-2 to be reflected and coupled into the outbound waveguide 230. The bridge waveguide 220 can be an optical fiber, waveguide or other optical transmission medium connected between the bridge on-ramp segment 225-1 and the bridge off-ramp segment 225-2.

Figure 3B:
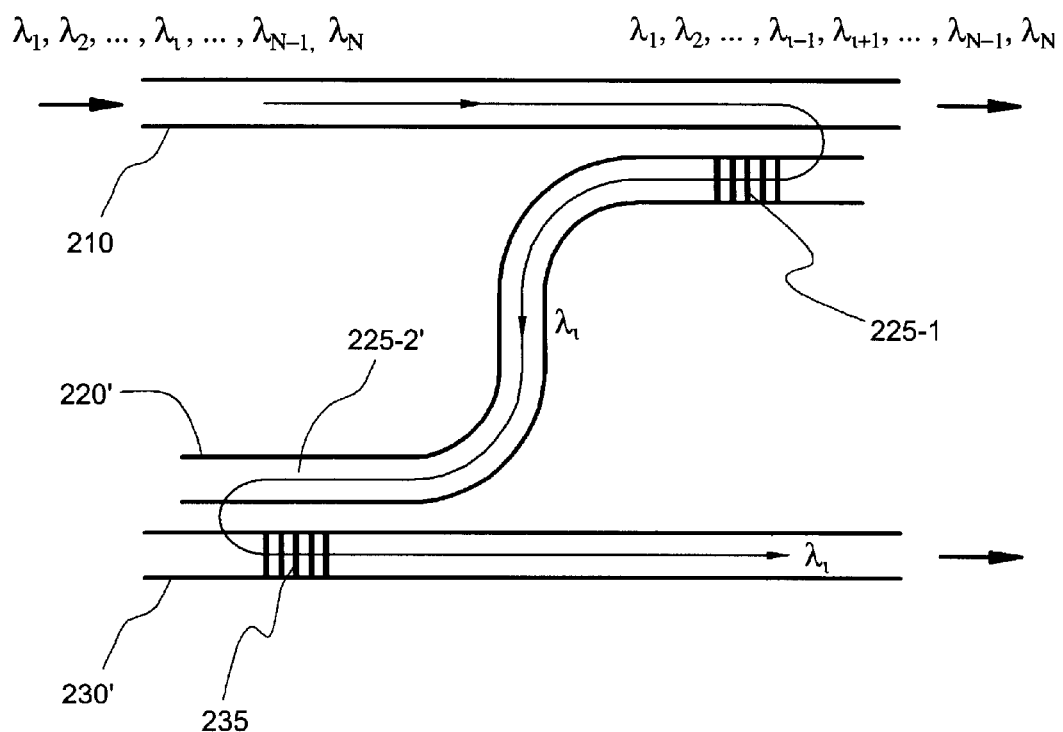

FIG. 3B shows another wavelength selective bridge waveguide 220' is coupled between a bus waveguide 210 and a second waveguide 230'. A multiplexed optical signal is transmitted in a bus waveguide 210 over N multiplexed wavelengths $\lambda_1, \lambda_2, \lambda_3, \ldots, \lambda_N$ where N is a positive integer. The wavelength selective bridge waveguide 220' has a first set of Bragg gratings disposed on a first "bridge on-ramp segment" 225-1 for coupling to the bus waveguide 210. An optical signal with a central wavelength A particular to the Bragg gratings 225-1 disposed on the bridge waveguide 220' is guided through the first bridge ramp segment 225-1 to be reflected into the wavelength selective bridge waveguide 220'.

The remainder optical signals of the wavelengths $\lambda_1, \lambda_2, \lambda_3, \lambda_{i-1}, \lambda_{i+1}, \ldots, \lambda_N$ are not affected and continues to transmit over the waveguide 210. The Bragg gratings 225-1 have a specific pitch for reflecting the optical signal of the selected wavelength $\lambda_i$ into the wavelength selective bridge waveguide 220'. The wavelength selective bridge waveguide 220' further has a bridge off-ramp segment 225-2' coupled to an outbound waveguide 230' near a section 235 of the outbound waveguide 230. The section 235 on the outbound waveguide 230' has a second set of Bragg gratings having a same pitch as the first set of Bragg gratings. The bridge waveguide 220 can be an optical fiber, waveguide or other optical transmission medium connected between the bridge on-ramp segment 225-1 and the bridge off-ramp segment 225-2'.

Figure 4A:
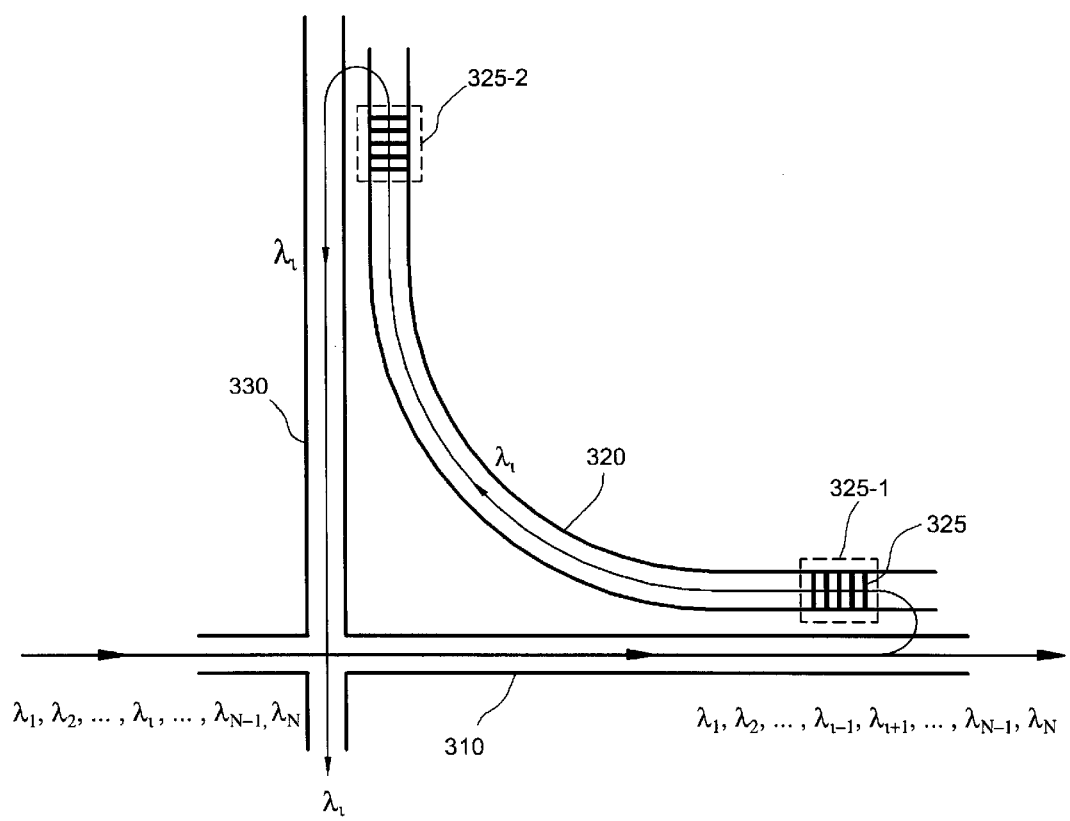
FIGS. 4A and 4B are functional diagrams for showing wavelength selective bridge waveguides acting as a switch that is coupled between the intersecting waveguides for switching and re-directing optical transmission of a selected wavelength.

FIG. 4A shows a wavelength selective bridge waveguide 320 is coupled between a bus waveguide 310 and an intersecting waveguide 330. Indeed, the following description shows the operation of the switches 115a–n at the intersection of the input waveguide 111 and the intersecting waveguides 113a–n. A multiplexed optical signal is transmitted in a bus waveguide 310 over N multiplexed wavelengths $\lambda_1, \lambda_2, \lambda_3, \ldots, \lambda_N$ where N is a positive integer. The wavelength selective bridge waveguide 320 (also referred to as the switch 115 of FIG. 1) has a first set of Bragg gratings disposed on a first "bridge on-ramp segment" 325-1 for coupling to the bus waveguide 310. An optical signal with a central wavelength $\lambda_i$ particular to the Bragg gratings 325 disposed on the bridge waveguide 320 is guided through the first bridge ramp segment 325-1 to be reflected into the wavelength selective bridge waveguide 320. The remainder optical signals of the wavelengths $\lambda_1, \lambda_2, \lambda_3, \ldots, \lambda_{i-1}, \lambda_{i+1}, \lambda_N$ are not affected and continues to propagate over the waveguide 310.

The Bragg gratings 325 have a specific pitch for reflecting the optical signal of the selected wavelength $\lambda_i$ into the wavelength selective bridge waveguide 320. The wavelength selective bridge waveguide 320 further has a second set of Bragg gratings 325 as a bridge off-ramp segment 325-2 coupled to an outbound waveguide 330. The bridge waveguide 320 can be an optical fiber, waveguide or other optical transmission medium connected between the bridge on-ramp segment and the bridge off-ramp segment 325-2.

Figure 4B:
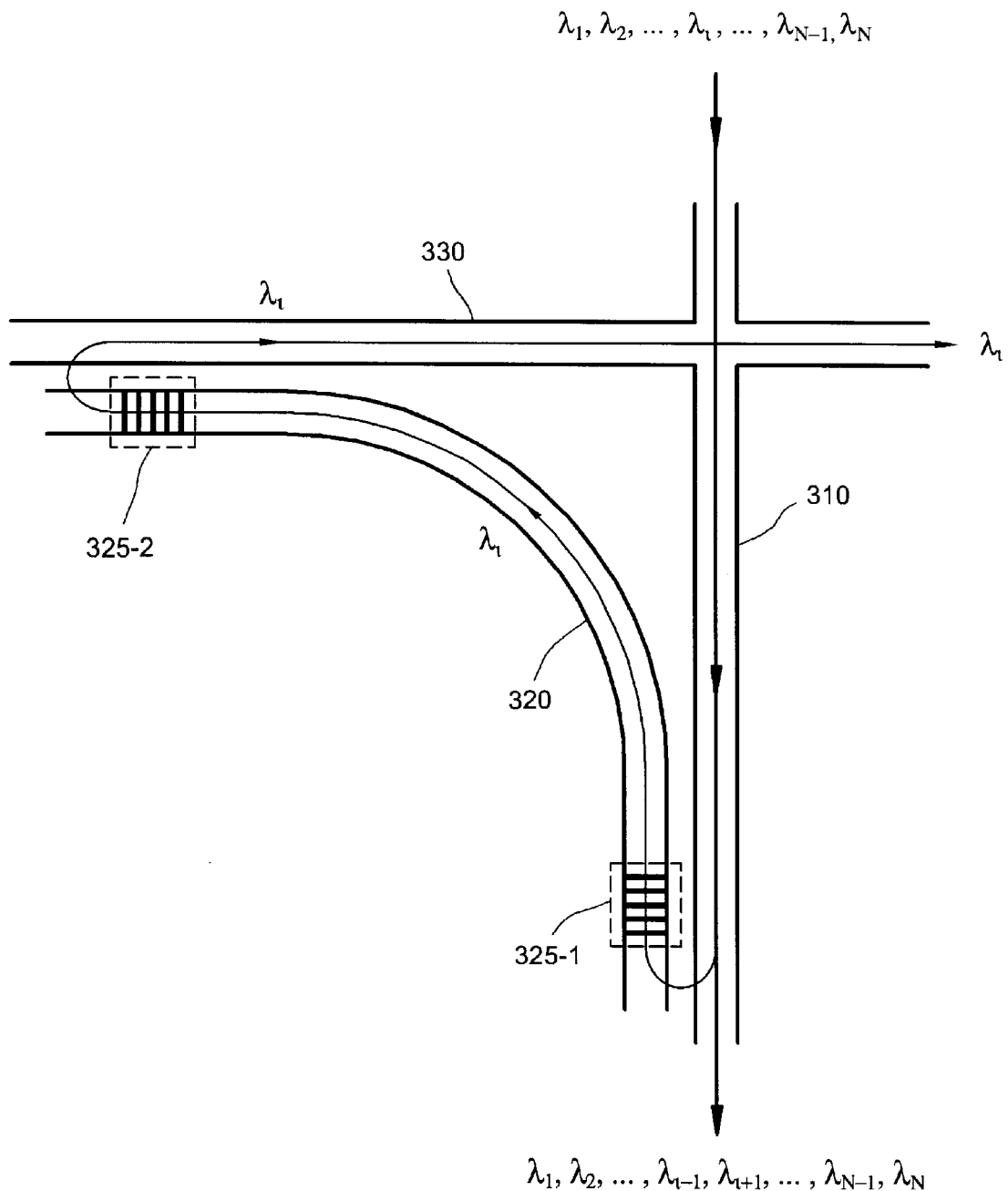

FIG. 4B is another embodiment with the bus waveguide 310 disposed in a vertical direction and an interesting outbound waveguide 330 disposed along a horizontal direction. As will be seen below, this embodiment of the switch is used in the non-movable bridge waveguide 109.

Figure 5A:
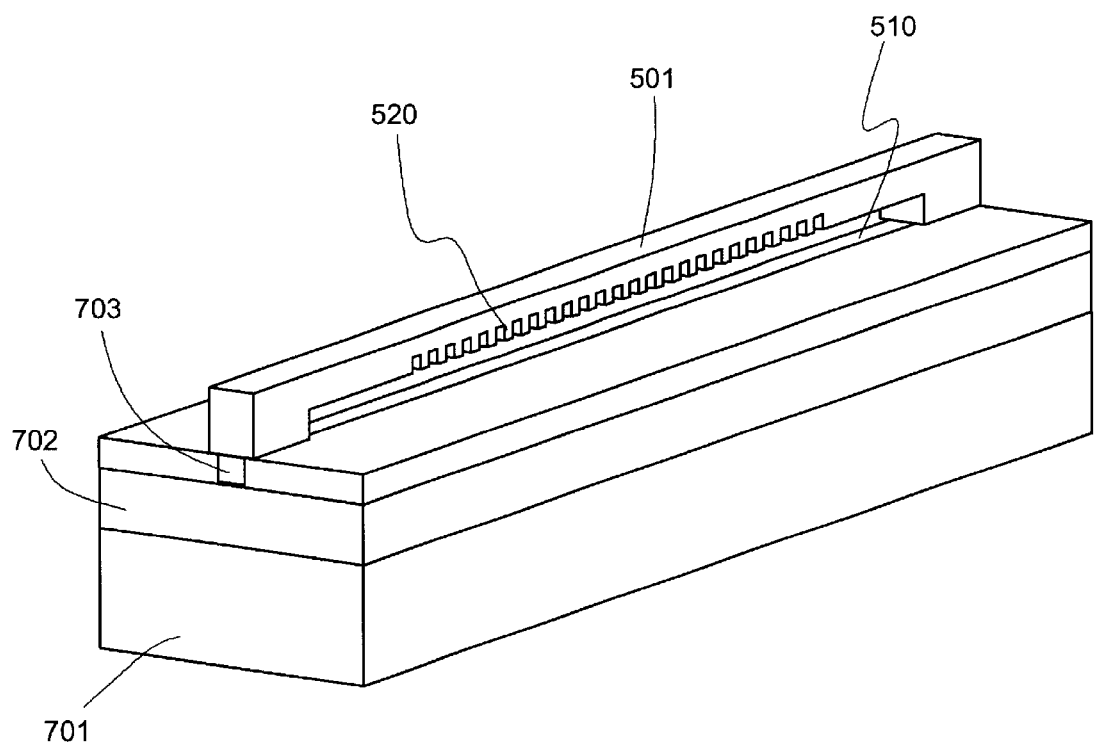
FIG. 5A illustrates a bridge-beam type switch with integrated Bragg grating element.

The structures shown in FIGS. 24 can be implemented as MEMS devices. For example, FIG. 5A depicts an illustrative embodiment of bridgebeam type switchable grating structure with integrated Bragg grating elements. The structure is fabricated using MEMS technology and semiconductor processing described below. On the substrate 701, a cladding layer 702 is formed first. Then the core layer 703 is deposited and patterned to form waveguide core that is shown more clearly in the cross-sectional view FIG. 5B. The bridge beam 501 is a waveguide consisting of integrated Bragg gratings 520 and an embedded electrode. When this waveguide, called a bridge waveguide, is electrostatically bent close enough to an waveguide 510, the wavelength that meets the Bragg phase-matching condition is coupled into the bridge waveguide. Through the bridge waveguide, the selected wavelength can then be directed into a desired output waveguide.

Figure 5B:
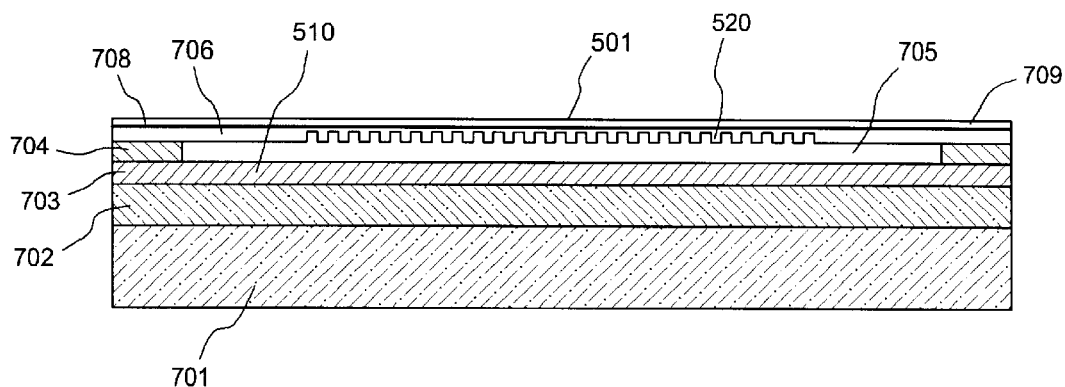
FIG. 5B illustrates the cross-sectional structure of a bridge-beam type switch in which the grating coupling is normally off.
Figure 5C:
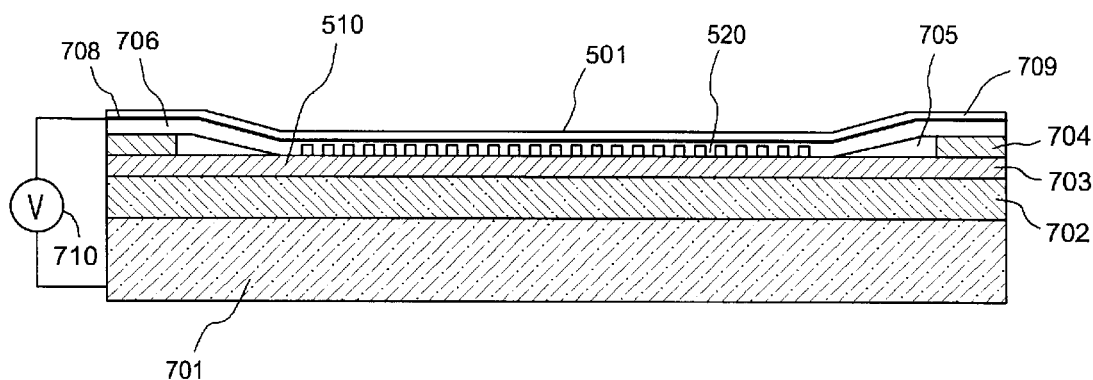
FIG. 5C shows the grating element of a bridge-beam type switch in the "on" position.

FIG. 5B shows the cross-sectional view of bridge-beam type switchable grating structure with integrated Bragg grating elements. After the cladding layer 702 and core layer 703 are deposited, a sacrificial layer is deposited after another cladding layer 704 is deposited and patterned. After the sacrificial layer is patterned and the grating grooves are etched on sacrificial layer, another cladding layer 706 is deposited. The electrode layer 708 and the insulation layer 709 are deposited subsequently. The etching process starts from layer 709 through into layer 704 after patterning. Finally the sacrificial layer is etched to form the air gap 705 between waveguide 510 and grating element 520. In an alternative way, the waveguide and the grating element can be fabricated on its own substrate first. Then they are aligned and bonded together to make the same structure shown in FIG. 5B. Due to the existence of air gap 705, the grating is off when the grating element is at normal position (no voltages applied). Referring to FIG. 5C, when an appropriate voltage 710 is applied between the electrode 708 and substrate 701, the grating element 520 is deflected toward waveguide 510 by the electrostatic force. The grating is turned "on" when the grating element 520 moving close enough to input waveguide 510.

Figure 6A:
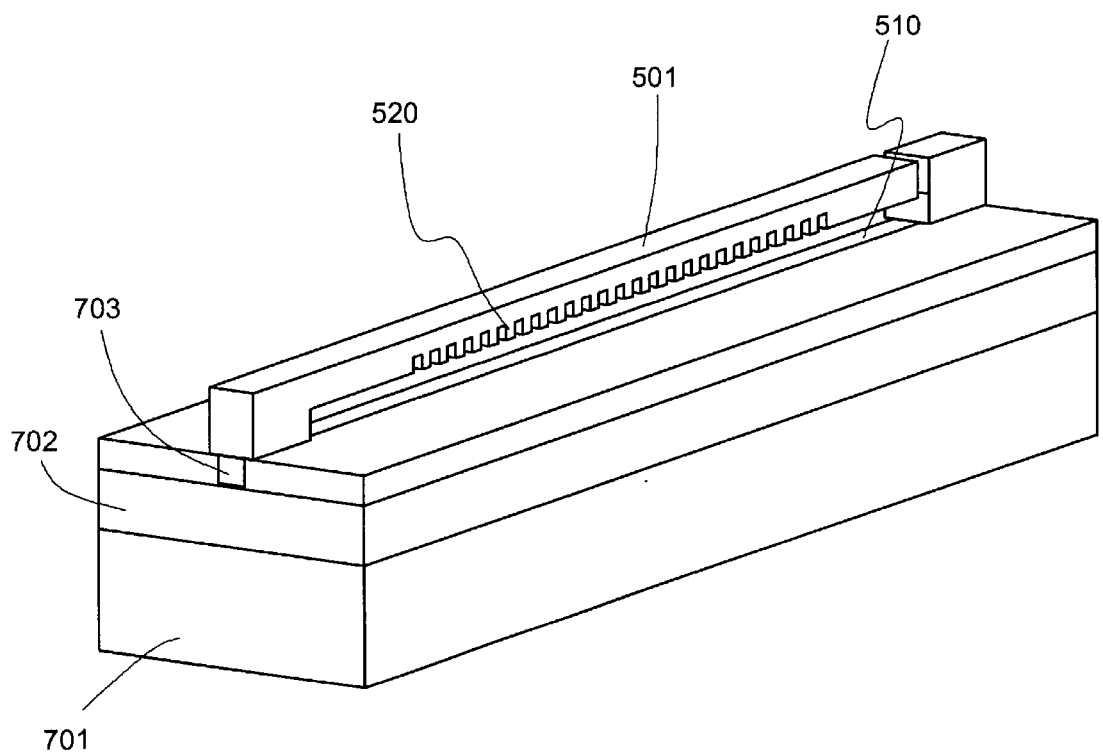
FIG. 6A illustrates a cantilever-beam type switch with integrated Bragg grating element.
Figure 6B:
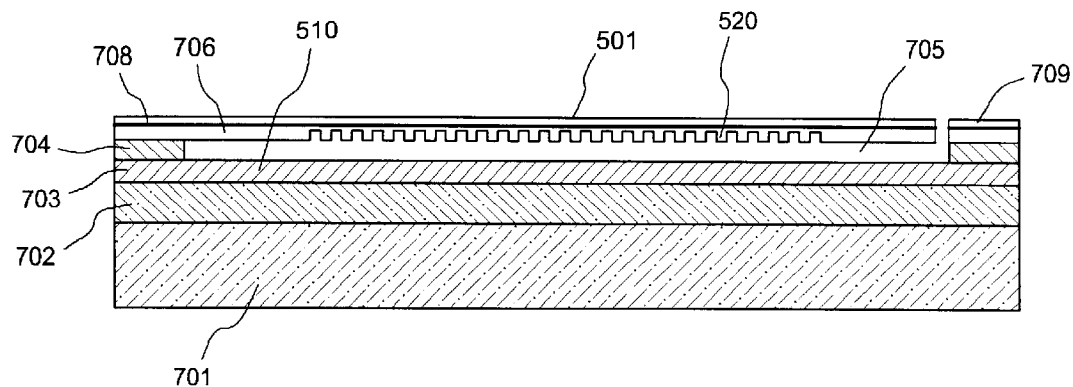
FIG. 6B illustrates the cross-sectional structure of a cantilever-beam type switch in which the grating coupling is normally off.
Figure 6C:
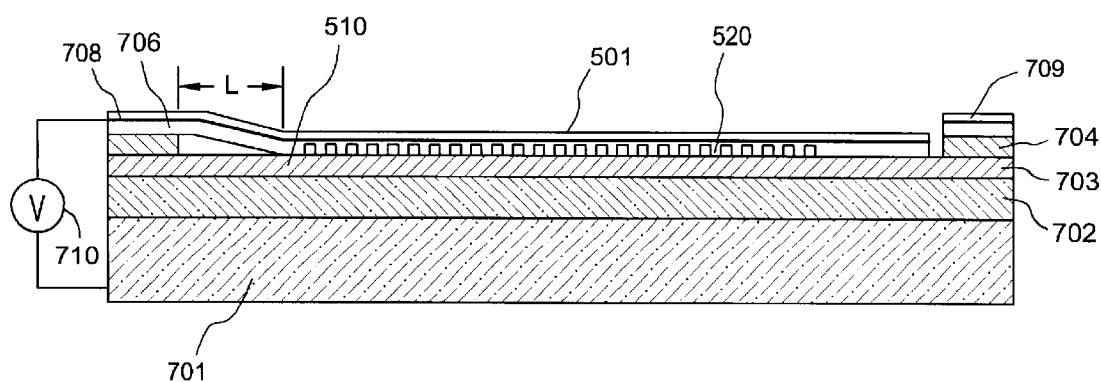
FIG. 6C shows the grating element of a cantilever-beam type switch in the "on" position.

FIG. 6A depicts an illustrative embodiment of cantilever-beam type switchable grating structure with integrated Bragg grating elements. The structure is fabricated using similar MEMS technology and semiconductor processing described above. In this arrangement, the stress and strain in the grating segment 520 can be reduced greatly. Therefore, the lifetime of grating element can be improved. FIG. 6B shows the cross-sectional structure of a cantileverbeam type switch. Referring to FIG. 6C, the cantilever beam 501 is deflected by the electrostatic force. Applying voltages 710 between substrate 701 and electrode 708 controls the electrostatic force applied to the cantilever beam 501. Therefore, by controlling the applying voltages 710 the wavelength-selective optical function can be activated through varying the degree of coupling between Bragg grating 520 and input waveguide 510.

An adequate beam length L is required in order to deflect the beam 501 to certain displacement within the elastic range of the material. For example, a 500um long cantilever Si beam with the section of 12um×3um can be easily deformed by 4um at the tip of the beam. Another major advantage for the cantilever beam structure is that the movable beam 501 can be shorter and therefore reduce the size of the switch.

Figure 7A:
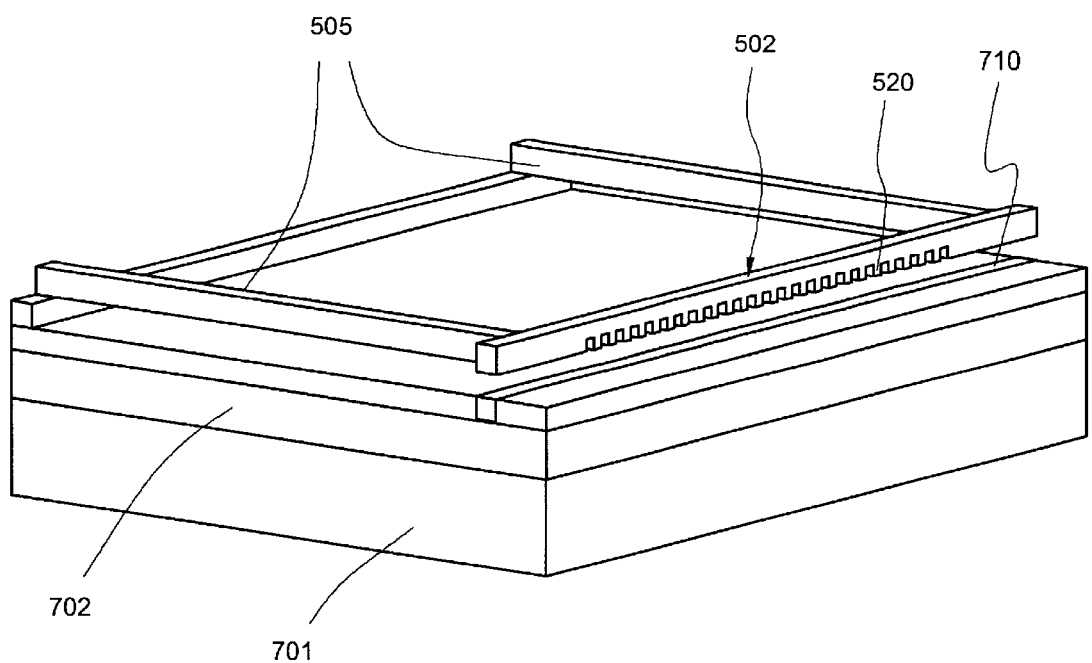
FIG. 7A illustrates a dual cantilever-beam type switch with integrated Bragg grating element.
Figure 7B:
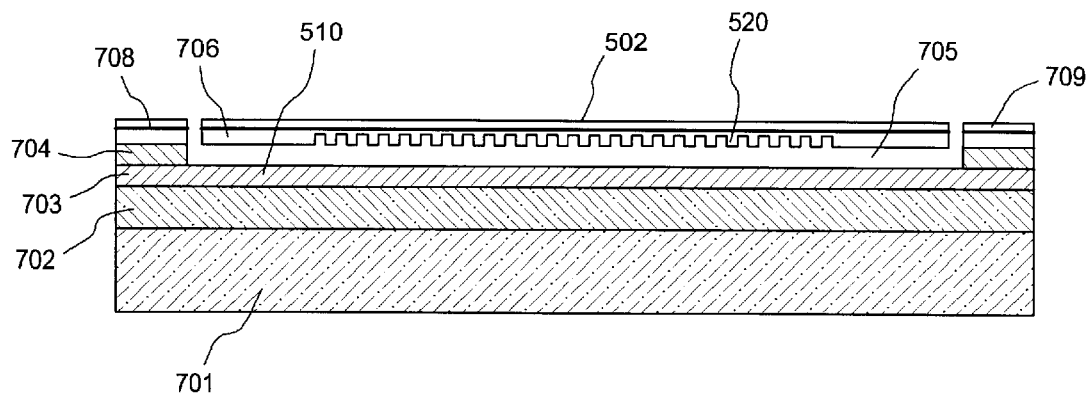
FIG. 7B illustrates the cross-sectional structure of a dual cantilever-beam type switch in which the grating coupling is normally off.
Figure 7C:
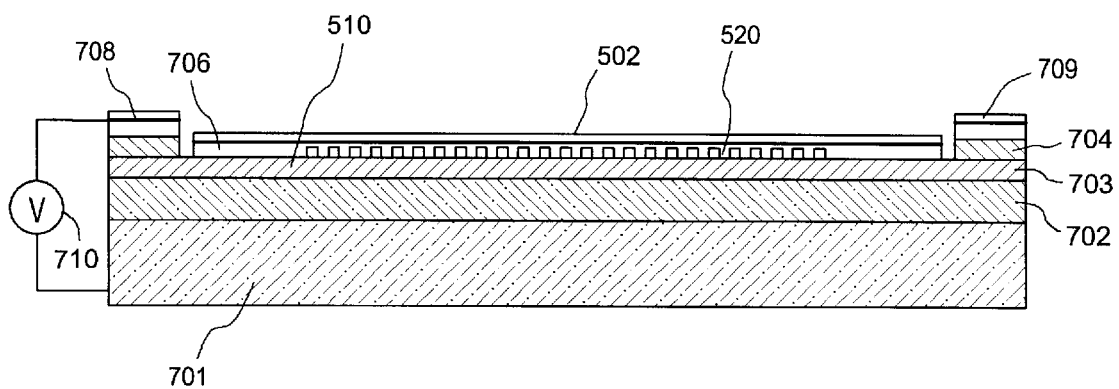
FIG. 7C shows the grating element of a dual cantilever-beam type switch in the "on" position.

FIG. 7A illustrates another embodiment of the switch. This is a dual cantilever-beam type switch. In this structure the grating element is fabricated on a movable beam 502, which is supported by two cantilever beams 505. In this arrangement, the stress and strain in the grating segment can be eliminated almost completely if the electrode pattern is also located appropriately. Another advantage is that the material of cantilever beams 505 does not necessarily have to be the same as the material of grating element 520. For instance, cantilever beams 505 can be made of metal to improve the elasticity of the beams. In addition, the anchor structure can be in different forms, e.g., MEMS springs or hinges. Therefore, a large displacement and smaller sized grating element is more achievable in this structure. FIGS. 7B and 7C shows the cross-sectional structure of a dual cantilever-beam type switch. Similar to the operations described above, the grating element 520 is moved towards the waveguide 510 by applying voltages 710 to electrode 708 and substrate 701.

Figure 8:
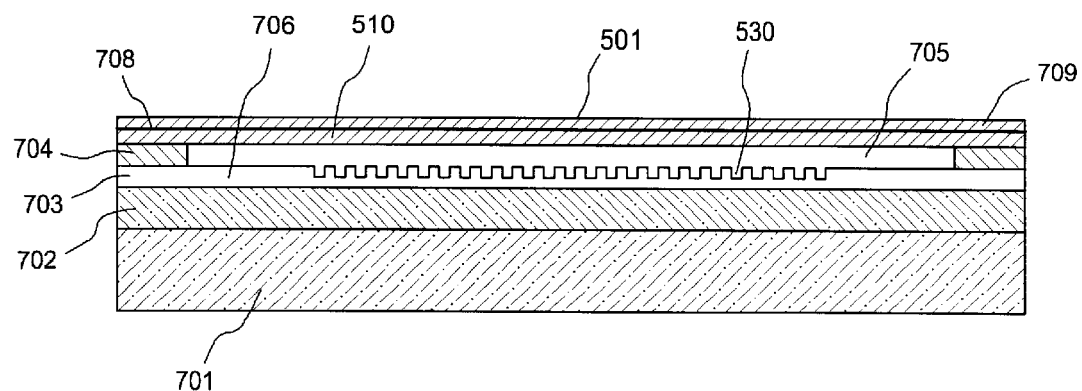
FIG. 8 illustrates the cross-sectional structure of another embodiment of the grating element.

FIG. 8 shows an alternate structure of the grating where the grating is located on the bottom side, or the surface side of the substrate. The structure can be fabricated by applying semiconductor processing technology to form the Bragg gratings 530 on the core layer 703 while positioning the movable beam 501 and the Bragg gratings 530 to have a small gap 705 from the waveguide 510. Similar to the operations described above, an electric conductive layer 708 is formed on the movable beam 501 for applying the voltage to assert an electrostatic force to bend the movable beam 501. The electrostatic force thus activates the movable switch by coupling a waveguide 706 to waveguide 510. The Bragg gratings 530 thus carry out a wavelength-selective optical switch function.

Figure 9:
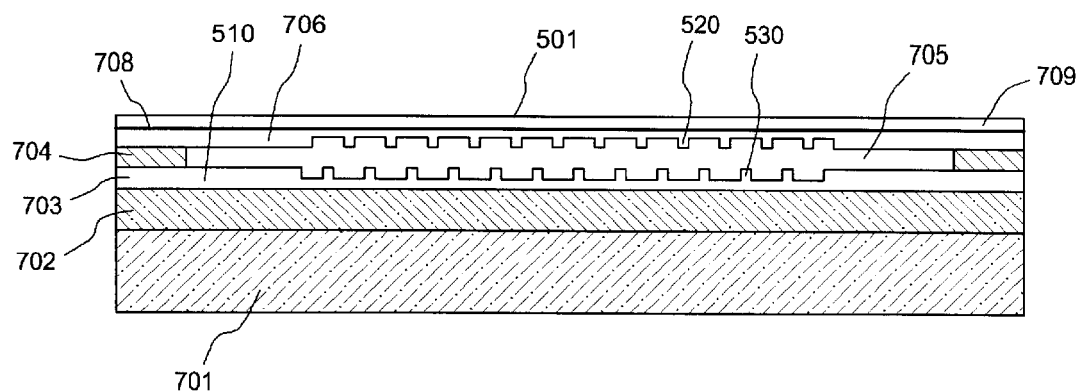
FIG. 9 illustrates an embodiment where the grating elements are fabricated on both the substrate and the movable beam.

FIG. 9 is also another alternate structure of switchable gratings. In this structure the grating is located on both top and bottom sides. Similar semiconductor processing technology can be used to form the Bragg gratings 520 on the movable beam 501 and the Bragg gratings 530 on the waveguide 510. A small gap is formed between waveguides 510 and 706. An electric conductive layer 708 is also formed on the movable beam 501 for applying the voltage to assert an electrostatic force to bend the movable beam 501. Similar to the operations described above, the electrostatic force thus activates the switch by coupling the selected wavelength from waveguide 510 to waveguide 706.

Figure 10:
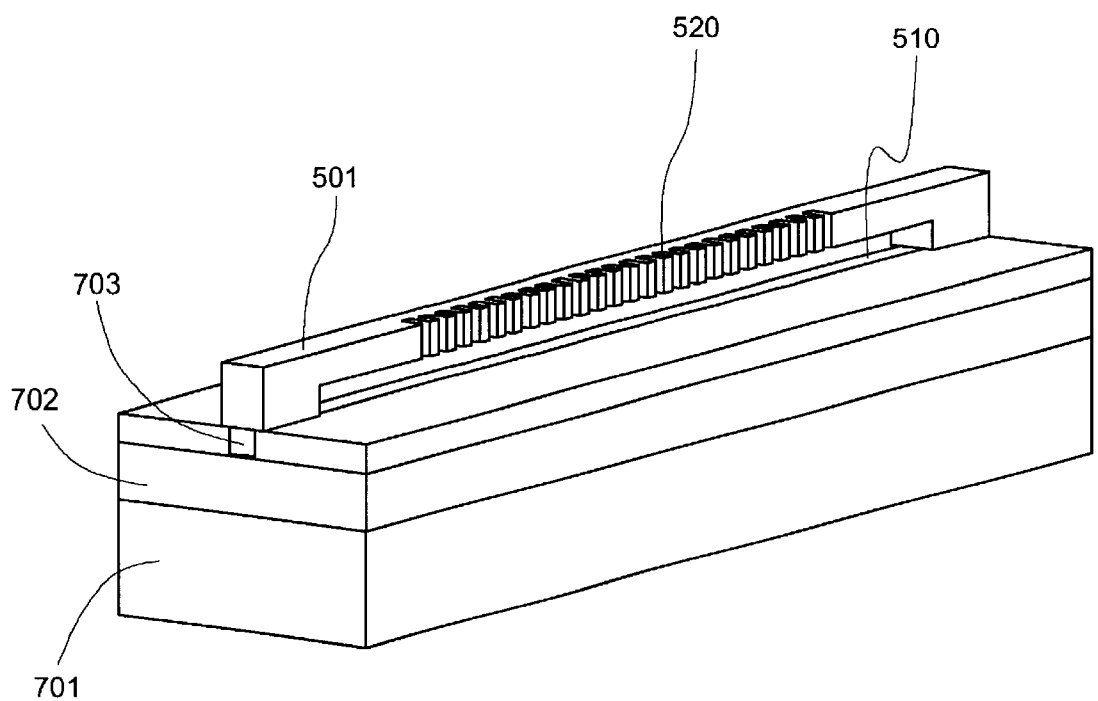
FIG. 10 illustrates an embodiment where the grating elements are fabricated on the horizontal sides of the movable beam.

In the structures described above, the grating element is located faced up or down to the substrate. However, the grating element can also fabricated on the sides of the waveguide, as illustrated in FIG. 10. In this embodiment, the gratings 520 are fabricated on the horizontal sides of the movable beam 501 and the rest of the structure are similar to those structure described above and all the wavelength-selective functions and operations are also similar to those described above. In addition, by rearranging the pattern of the electrode, the grating structure can also be made on the top side of the cantilever or bridge beams. This structure may provide a cost advantage in manufacturing.

Figure 11A:
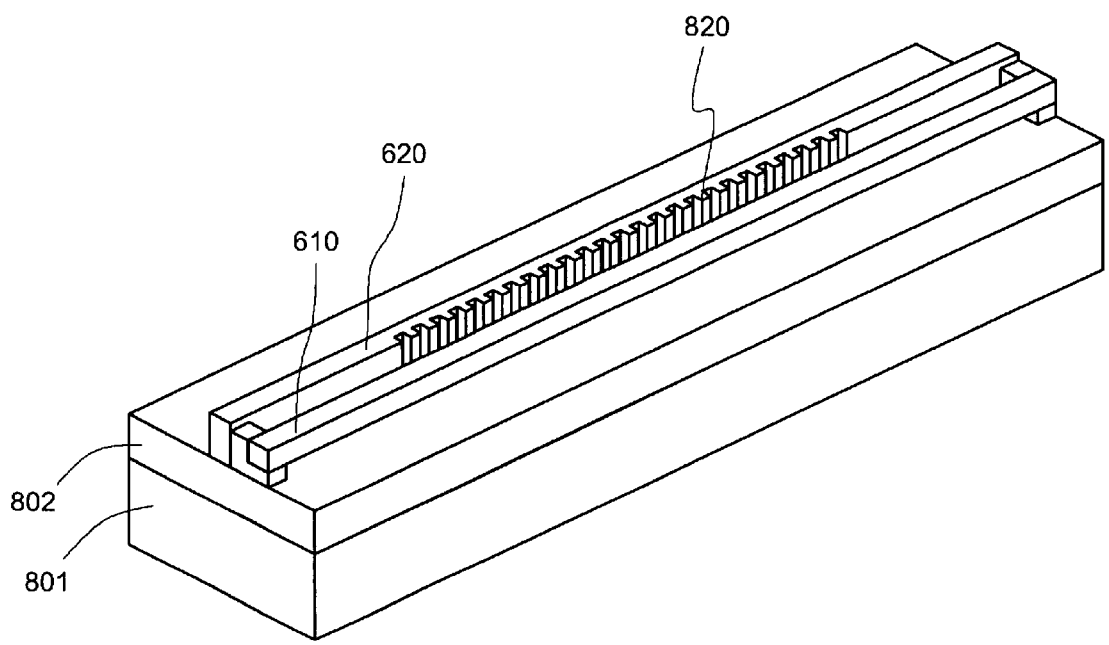
FIGS. 11A and 11B illustrate a grating element where the waveguides are both fabricated on the same surface of the substrate.
Figure 11B:
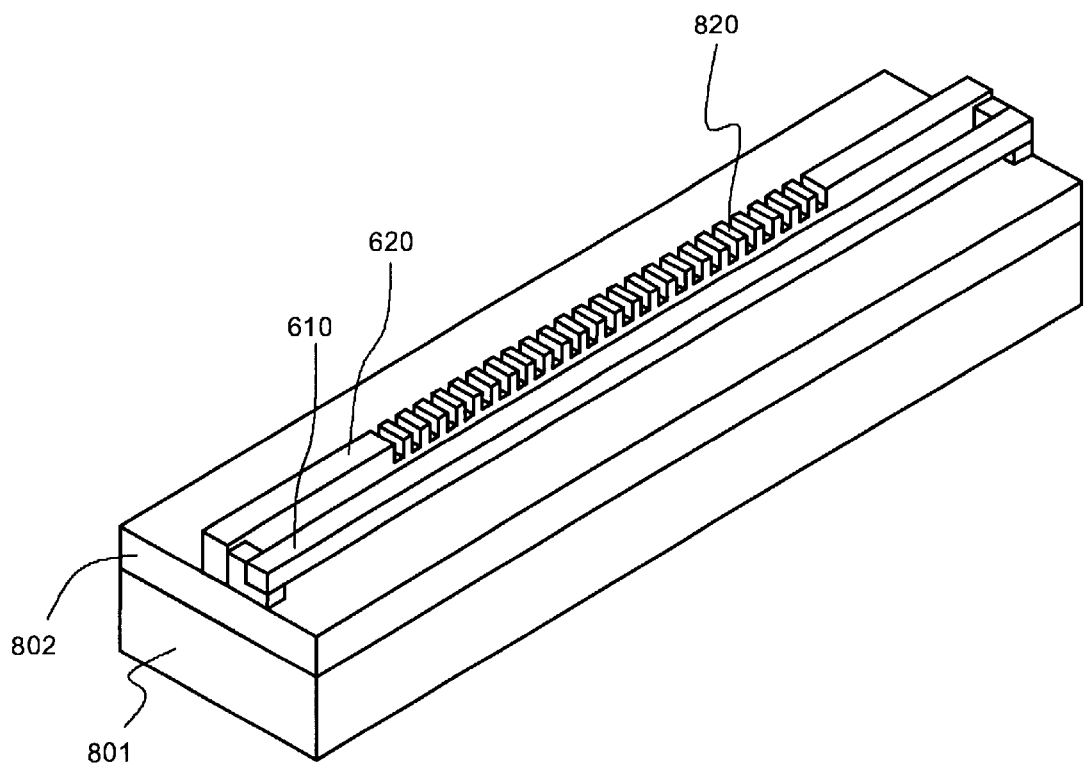

FIG. 11A shows another structure of switchable gratings. Instead of arranging the coupling waveguides as several vertical layers supported on a semiconductor substrate as shown above, the coupling waveguides 610 and 620 are formed as co-planar on a same cladding layer 802, supported on a semiconductor substrate 801. The movable waveguide 610 and coupling waveguide 620 have their own embedded electrodes, similar to those described above. Again, the Bragg gratings 820 can be formed on one or both of the waveguides 610 and 620 as described above. When electrostatic voltages are applied between these electrodes, movable waveguide 610 is moved towards waveguide 620 and thus activate the optical switch. FIG. 11B shows another structure with the gratings 820 facing upward.

Returning to FIG. 1, the demultiplexer 103 is operative to separate a multiplexed optical signal $\lambda_1, \lambda_2, \lambda_3, \ldots, \lambda_N$ into individual wavelengths carried along the associated intersecting waveguide 111. The demultiplexer switches 113a–n have Bragg gratings that have a periodicity matched to the wavelength that is to be switched into the intersecting waveguide 111. Thus, the demultiplexer switch 113a has a periodicity adapted for switching the optical signal $\lambda_1$ into the intersecting waveguide 111a. Similarly, the demultiplexer switch 113b has a periodicity adapted for switching the optical signal $\lambda_2$ into the intersecting waveguide 111b, and so on, until the demultiplexer switch 113n switches the optical signal $\lambda_N$ into the intersecting waveguide 111n.

Further, as seen in FIG. 1, each of the intersecting waveguides 111a–n are input into an associated wavelength converters 105a–n. In FIG. 1, for clarity, only two wavelength converters 105a and 105b are shown. Although any one of a number of different commercially available wavelength converters 105 may be used, the wavelength converter disclosed in our co-pending patent application filed Sep.26, 2002 entitled "WAVELENGTH CONVERTER USING BRAGG-GRATING" and accorded Ser. No. 10/256, 480 (incorporated by reference herein) may be utilized.

With more typical prior art devices, the wavelength converter 105 includes a broadband light source 802, a tunable grating 804, and a semiconductor optical amplifier (SOA) 806. The broadband light source 802 provides light across a spectrum of wavelengths, and more particularly, wavelengths within the band of interest. In one embodiment, the broadband light source 802 provides light in the range of 1520 to 1570 nanometers, also referred to as the "C-band".

The broadband light source 802 provides the broadband light as an input to the tunable grating 804. The tunable grating 804 is a device that acts as a tunable filter to output a selected wavelength based upon a control signal. By varying the control signal, the particular selected wavelength is allowed to pass through, while the other wavelengths produced by the light source 802 is screened.

The output of the tunable grating 804 is provided to the SOA 806. The SOA 806 is operative to receive the selected wavelength $\lambda$ from the tunable grating 804 and amplify the optical signal in accordance with an input control signal. The input control signal may either be electrical or optical in nature. Typically, the input control signal is modulated with data. In this embodiment, the, the input control signal is related to the optical signal having a first wavelength that is to be converted to the second wavelength. The output of the SOA 806 is thus an optical signal of a predetermined wavelength that is amplified and modulated by the control signal. In other words, the output of the SOA 806 is the predetermined wavelength modulated by the data carried by the optical signal of the first wavelength. Thus, the wavelength converter 105a converts the input control signal (the optical signal $\lambda_1$ from the intersecting waveguide 111a) into a different selected wavelength (referred to also as a converted wavelength channel).

In many respects, SOA 806 is similar in construction to a conventional semiconductor laser in that it consists of a layer of semiconductor material (known as the active region), sandwiched in between other layers of semiconductors of a different composition. An electrical current (as the control signal) is passed through the device and serves to excite electrons in the active region. When photons travel through the active region, this will cause these electrons to lose some of their extra energy in the form of more photons that match the wavelength (or wavelengths) of the initial input. Therefore, an optical signal passing through the active region is amplified and is said to have experienced gain. Moreover, by varying the electrical current either in the amplitude for time domain, the optical signal can be modulated. Additionally, the semiconductor layers that sandwich the active region are designed to help guide the light through the device. This is achieved through a difference in refractive index from the active region, in much the same way as the refractive index differs between an optical fiber's core and its cladding help to guide light. The SOA 806 is commercially available from companies such as Alcatel, Kamelian, Opto Speed, and others.

In one embodiment, the SOA 806 is controlled by a control signal related to the data carried on the optical signal having the first wavelength. In some embodiments, the optical signal having the first wavelength of light is directly input to the SOA 806 to control the amplification effect.

Note that although FIG. 1 shows that each wavelength converter 105 is shown as having a dedicated light source 802, a single light source 802 may be shared among many wavelength converters 105. Further, as noted above, although one specific type of wavelength converter is described herein, any type of wavelength converter may be used. Moreover, by controlling the SOAs 806, the signal intensity can be adjusted. By increasing the gain in the wavelength converters 105, the optical switch 107 can be adapted for long haul or ultra long haul applications.

Returning to FIG. 1, the output of the SOA 806 (and thus the wavelength converter 105a) is provided onto a switch input waveguide 808a. Similarly, the output of the wavelength converter 105b is provided onto switch input waveguide 808b.

The output switch 107 includes a plurality of switch input waveguides 808a–n, a plurality of output waveguides 812-1 through 812-n, and a plurality of output intersection switches 810x–y, where x denotes the particular switch input waveguide 808 and y denotes the particular output waveguide 812.

Each of the output intersection switches 810 extracts from the switch input waveguides 808 the appropriate wavelength. Thus, output intersection switches 810a-1 and 810b-1, when activated, will switch an optical signal of $\lambda_1$ onto the output waveguide 812-1. Similarly, output intersection switches 810a-2 and 810b-2, when activated, will switch an optical signal of $\lambda_2$ onto the output waveguide 812-2, and so on. Thus, the output switch 107 can selectively switch signals output from the wavelength converters 105 to any of the output waveguides 812. The switches 810x–y are similar to that of the switches 113a-113n described above.

The result is that the switch 101 is bit rate independent and protocol transparent to the traffic being carried. Moreover, the optical switch 107 may be formed on a single integrated circuit. From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. An apparatus comprising:
   an input waveguide for carrying a multiplexed optical signal comprised of a plurality of wavelength channels;
   a demultiplexer for separating the multiplexed optical signal into said plurality of wavelength channels, said demultiplexer placing one of said plurality of wavelength channels onto an associated one of a plurality of intersecting waveguides;
   a wavelength converter associated with each said intersecting waveguides, said wavelength converter operative to convert the one of said wavelength channels on said intersecting waveguide into a converted wavelength channel, said wavelength converter outputting said converted wavelength channel onto a switch input waveguide; and
   a switch receiving as inputs said switch input waveguides from said wavelength converters, said switch operative to selectively switch said converted wavelength channels onto output waveguides.

2. The apparatus of claim 1 wherein said plurality of intersecting waveguides of said demultiplexer intersect with said input waveguide, said demultiplexer further including a plurality of switches located at the intersections of said intersecting waveguides and said input waveguide, said plurality of switches for selectively coupling from said input waveguide a selected wavelength channel of said multiplexed optical signal into said intersecting waveguides.

3. The apparatus of claim 2 wherein said plurality of switches each include a movable coupling waveguide formed with Bragg gratings for moving close and coupling to said input waveguide to wavelength selectively transmit said selected wavelength channel with a wavelength phase-matched with said Bragg gratings in said coupling waveguide and for moving away and de-coupling from said input waveguide to switch off said switch.

4. The apparatus of claim 3 further comprising an electric control means for electrically switching on and off said switch.

5. The apparatus of claim 3 further comprising an electrostatic control means for electrostatically switching on and off said switch.

6. The apparatus of claim 3 wherein said switches further includes a controllable electrode provided to selectively turn "on" said switch.

7. The apparatus of claim 3 wherein said switch is formed as a movable waveguide beam disposed near said input waveguide.

8. The apparatus of claim 3 wherein said switch is formed as a movable waveguide bridge having bridge supports on both ends of said movable waveguide bridge.

9. The apparatus of claim 3 wherein said switch is formed as a movable waveguide having a cantilever support on one end of said movable waveguide.

10. The apparatus of claim 3 wherein said switch is formed as a dual-cantilever movable waveguide having dual cantilever supports on both ends of said dual-cantilever movable waveguide.

11. An optical switch with wavelength conversion comprising:
    an input waveguide for carrying a multiplexed optical signal comprised of a plurality of wavelength channels;
    a demultiplexer for separating the multiplexed optical signal into said plurality of wavelength channels, said demultiplexer comprising:
    (1) a plurality of intersecting waveguides, said intersecting waveguides intersecting with said input waveguide at intersections;
    (2) a plurality of switches located at said intersections, each of said switches operative to selectively place one of said plurality of wavelength channels onto the intersecting waveguide at said intersection;
    a wavelength converter associated with each said intersecting waveguides, said wavelength converter operative to convert the one of said wavelength channels on said intersecting waveguide into a converted wavelength channel, said wavelength converter outputting said converted wavelength channel onto a switch input waveguide; and
    a switch receiving as inputs said switch input waveguides from said wavelength converters, said switch operative to selectively switch said converted wavelength channels onto output waveguides.

12. The optical switch of claim 11 wherein said wavelength converters comprise:
    a broadband light source;
    a tunable grating; and
    a semiconductor optical amplifier.

13. The optical switch of claim 11 wherein said plurality of switches each include a movable coupling waveguide formed with Bragg gratings for moving close and coupling to said input waveguide to wavelength selectively transmit said one of said plurality of wavelength channels with a wavelength phase-matched with said Bragg gratings in said coupling waveguide and for moving away and de-coupling from said input waveguide to switch off said switch.

14. The optical switch of claim 11 further comprising an electric control means for electrically switching on and off said switches.

15. The optical switch of claim 11 further comprising an electrostatic control means for electrostatically switching on and off said switches.

16. The optical switch of claim 11 wherein said switches further includes a controllable electrode provided to selectively turn "on" said switch.

17. The optical switch of claim 11 wherein said switch is formed as a movable waveguide beam disposed near said input waveguide.

18. The optical switch of claim 11 wherein said switch is formed as a movable waveguide bridge having bridge supports on both ends of said movable waveguide bridge.

19. The optical switch of claim 11 wherein said switch is formed as a movable waveguide having a cantilever support on one end of said movable waveguide.

20. The optical switch of claim 11 wherein said switch is formed as a dual-cantilever movable waveguide having dual cantilever supports on both ends of said dual-cantilever movable waveguide.

* * * * *

UNITED STATES PATENT AND TRADEMARK OFFICE
CERTIFICATE OF CORRECTION

PATENT NO. : 6,628,858 B2
DATED : September 30, 2003
INVENTOR(S) : Jianjun Zhang et al.

It is certified that error appears in the above-identified patent and that said Letters Patent is hereby corrected as shown below:

Column 3,
Line 4, "111a14 111n" should be -- 111a-111n --;
Line 58, delete period between "and" and "2F";

Column 5,
Line 23, "FIGS. 24" should be -- FIGS. 2-4 --;
Line 25, "bridgebeam" should be -- bridge-beam --;

Column 6,
Line 4, "cantileverbeam" should be -- cantilever-beam --.

Signed and Sealed this

Thirteenth Day of January, 2004

JON W. DUDAS
*Acting Director of the United States Patent and Trademark Office*